United States Patent
Eckstein

(10) Patent No.: US 9,592,857 B2
(45) Date of Patent: Mar. 14, 2017

(54) CLOSING PLUG FOR AN OPENING IN A BODY STRUCTURE OF AN AUTOMOBILE

(71) Applicant: ILLINOIS TOOL WORKS INC., Glenview, IL (US)

(72) Inventor: Frank Eckstein, Giebelstadt (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/897,235

(22) PCT Filed: Apr. 23, 2014

(86) PCT No.: PCT/US2014/035106
§ 371 (c)(1),
(2) Date: Dec. 9, 2015

(87) PCT Pub. No.: WO2014/209480
PCT Pub. Date: Dec. 31, 2014

(65) Prior Publication Data
US 2016/0129781 A1    May 12, 2016

(30) Foreign Application Priority Data

Jun. 26, 2013  (DE) ............ 10 2013 010 598

(51) Int. Cl.
*B62D 25/24* (2006.01)
*F16K 15/14* (2006.01)
(Continued)

(52) U.S. Cl.
CPC .............. *B62D 25/24* (2013.01); *B60K 15/04* (2013.01); *B60R 13/06* (2013.01); *B60R 99/00* (2013.01);
(Continued)

(58) Field of Classification Search
CPC ...... B62D 25/24; F16K 15/144; F16K 15/148
(Continued)

(56) References Cited

U.S. PATENT DOCUMENTS 3,354,903 A * 11/1967 Caruso .................. F16K 15/148
                                                   137/512.15
5,709,309 A *  1/1998 Gallagher ............... B62D 25/24
                                                   137/849
(Continued)

FOREIGN PATENT DOCUMENTS

EP          1524140 A1    4/2005
WO       2013049160 A1    4/2013

OTHER PUBLICATIONS

ISR and WO for PCT/US2014/035106 mailed Jul. 30, 2014, 9 pages.

*Primary Examiner* — Jason S Morrow
(74) *Attorney, Agent, or Firm* — Hauptman Ham, LLP

(57) ABSTRACT

A closing plug for an opening in a body structure of an automobile, wherein the closing plug closes the opening against a passage of fluid and/or gas up to a limit pressure which acts on the closing plug, and allows a passage of fluid and/or gas above the limit pressure, characterized in that the closing plug comprises a base body consisting of a first plastic material, which has a holding section with holding means for holding the closing plug in the opening and a plate-shaped head section provided on one end of the holding section with at least one opening and that the closing plug comprises a sealing body of a second plastic material molded onto the base body in a plastic injection molding process.

20 Claims, 2 Drawing Sheets

Figure 1:
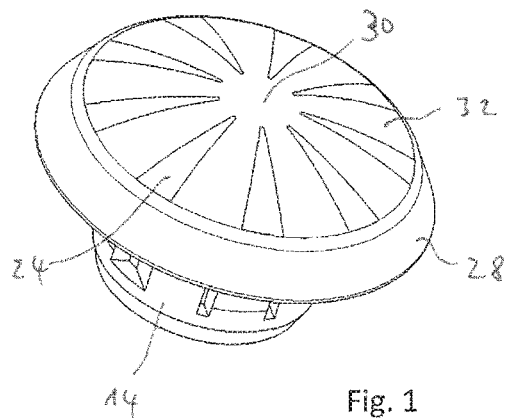

(51) Int. Cl.
    *F16K 17/04*     (2006.01)
    *B60K 15/04*    (2006.01)
    *B60R 13/06*    (2006.01)
    *B60R 99/00*    (2009.01)
    *B60K 15/03*    (2006.01)

(52) U.S. Cl.
    CPC .......... *F16K 15/144* (2013.01); *F16K 15/148* (2013.01); *F16K 17/0453* (2013.01); *B60K 2015/03447* (2013.01)

(58) Field of Classification Search
    USPC .................................... 296/1.06; 137/512.15
    See application file for complete search history.

(56)           References Cited

U.S. PATENT DOCUMENTS

| | | | |
|---|---|---|---|
| 6,299,177 B1* | 10/2001 | Rehberg ................ | B62D 25/24 |
| | | | 277/630 |
| 2005/0081921 A1* | 4/2005 | Blake, III .............. | B60H 1/249 |
| | | | 137/512.15 |
| 2009/0257688 A1* | 10/2009 | Calvo ................ | B65D 33/2508 |
| | | | 383/103 |
| 2014/0361015 A1* | 12/2014 | Weiler .................. | B62D 25/24 |
| | | | 220/305 |
| 2016/0074682 A1* | 3/2016 | Kudav .................. | A62B 18/10 |
| | | | 128/205.24 |

* cited by examiner

CLOSING PLUG FOR AN OPENING IN A BODY STRUCTURE OF AN AUTOMOBILE

RELATED APPLICATIONS

The present application is a National Phase of International Application Number PCT/US2014/035106 filed Apr. 23, 2014 and claims priority to German Application Number 10 2013 010 598.6 filed Jun. 26, 2013.

The invention relates to a closing plug for an opening in a body structure of an automobile, wherein the closing plug closes the opening against a passage of fluid and/or gas up to a limit pressure, which acts on the closing plug, and allows a passage of fluid and/or gas above the limit pressure.

Closing plugs of this type serve, for example, as what are known as water outlet grommets for closing body openings against an entry of water from the outside. At the same time, they are to allow a passage of water from the body inner side to the outside. For example, water outlet grommets are known which have a base body with a plurality of passage openings. A silicone section is fastened to the base body by way of a mechanical connection, which silicone section closes the passage openings in the basic state and, upon acting of a sufficient fluid pressure, releases them for the passage of fluid and therefore for pressure equalization. Closing plugs are also required in body structures which are to be foamed sealingly from the inner side. In this case, a passage of gas which is displaced during the foaming process is to be made possible by way of the closing plugs for pressure equalization. After the foaming, the body structure is to be completely water-tight.

The known closing plugs are complicated, to produce, in particular with regard to the mechanical connection of the silicone section to the base body. There is also a risk that the mechanical connection is released during operation and therefore the sealing function of the closing plug is no longer ensured. Furthermore, the flexibility of the adaptation of the closing plug to different use conditions can be increased slightly or only with great expenditure.

Proceeding from the described prior art, the invention is based on the object of providing a closing plug for an opening in a body structure of an automobile, which closing plug is simple to produce, ensures a reliable function during operation and affords high flexibility with regard to the adaptation to different use conditions.

For a closing plug of the type mentioned at the outset, the invention achieves the object by virtue of the fact that the closing plug has a base body consisting of a first plastic material, which has a holding section with holding means for holding the closing plug in the opening and a plate-shaped head section formed at one end of the holding section with at least one opening, and that the closing plug has a sealing body made from a second plastic material which is molded onto the base body in a plastic injection molding process, wherein the second plastic material is softer than the first plastic material, and wherein the sealing body has at least one elastically moveable sealing arm, wherein the at least one sealing arm sealingly covers the at least one opening of the plate-shaped head section from the upper side of the plate-shaped head section facing away from the holding section against a passage of fluid and/or gas up to the limit pressure, wherein the at least one sealing arm elastically deforms upon acting of a pressure above the limit pressure with the release of the at least one opening for a passage of fluid and/or gas. The at least one opening is a through opening, in particular a through hole. In particular, a plurality of openings of this type can be formed in the plate-shaped head section, wherein the sealing body then has a plurality of sealing arms which sealingly cover the plurality of openings of the plate-shaped head section from the upper side of the plate-shaped head section facing away from the holding section against a passage of fluid and/or gas up to the limit pressure, wherein the plurality of sealing arms elastically deform upon acting of a pressure above the limit pressure with the release of the plurality of openings for a passage of fluid and/or gas.

A first application of the closing plug according to the invention is the use as a water outlet grommet, that is to say to secure a body opening against an entry of fluid from the outside during operation of the automobile. At the same time, an outflow of fluid, for example water, which collects on the inner side of the body structure is to be made possible. In this case, a sufficient fluid pressure from the inner side of the body structure leads to opening of the closing plug and therefore to the outlet of the fluid and pressure equalization. Closing plugs of this type can be used, for example, in the region of the sills or the trunk of an automobile.

Another application is the sealing of body structures which are foamed on the inner side and are to be completely water-tight after foaming. Foaming of this type takes place, for example, with a PU foam. In this application, the closing plug serves, in particular, for pressure equalization during foaming, namely for making a passage of gas, for example air, which is displaced by the foam possible. In this case, the air or gas pressure from the inside, therefore leads to opening of the closing plug.

As a result, the invention also relates to a body structure of the above-described types with at least one opening and at least one closing plug according to the invention which is arranged therein.

The closing plug according to the invention consists of two plastic components, namely a hard component which forms the base body and a soft component which forms the sealing body and is molded onto the hard component in a plastic injection molding process. The hard component, that is to say the base body, gives the closing plug sufficient dimensional stability and at the same time serves as fastening means to the body opening. The base body therefore ensures reliable retention of the closing plug on the body structure during operation. The soft component, that is to say the sealing body, firstly provides the sealing function for sealing the body opening during operation. Secondly, the desired pressure equalization is realized by way of the sealing body if a limit pressure is exceeded by the pressure which acts on the closing plug from the body inner side.

For this purpose, the sealing body according to the invention has one or more elastic sealing arms which are arranged on the upper side of the plate-shaped head section. In this context, the upper side is defined as the side of the plate-shaped head section which faces away from the holding section. The holding section therefore extends, in particular, in a manner which starts from the underside of the plate-shaped head section. In its/their basic state, that is to say until the limit pressure is exceeded, the sealing arm or sealing arms lies/lie on the upper side of the plate-shaped head section. Correspondingly, the side of the at least one sealing arm which faces away from the head section is defined as the upper side of the at least one sealing arm. The underside of the at least one sealing arm is the side which faces the head section and rests on the head section in the basic state. The upper sides and undersides which are defined in this context serve merely to explain the invention. It goes without saying that it is therefore not associated with any restriction at all with regard to the installation situation of the closing plug in a body structure. In particular, the closing plug according to the invention can be inserted into body structures in any desired attitude and position.

Until the limit pressure is exceeded, the closing plug seals the body opening against a passage of gas and/or fluid. Upon acting of a pressure which is greater than the limit pressure and acts from the body inner side, that is to say from the side of the holding section, on the head section and the opening/openings and therefore on the sealing arm or sealing arms, the sealing arm or sealing arms is/are bent elastically to the outside (away from the head section) and thus allow the passage of gas and/or fluid through the opening/openings of the head section. After the passage and therefore pressure equalization have taken place, the sealing arm or sealing arms moves/move back into its/their basic state which seals the opening/openings. The respective limit pressure can be adapted in a targeted and flexible manner to the respective application by way of suitable configuration of the sealing arm or the sealing arms, in particular the thickness, width or length thereof, and by way of the selection of suitable plastic materials.

The closing plug according to the invention affords the function of a pressure limiting valve. A reliable sealing function is ensured until the limit pressure is exceeded. If the limit pressure is exceeded, reliable pressure equalization takes place. Here, the closing plug according to the invention can be produced more simply in comparison with the prior art and has high flexibility with regard to the adaptations to very different use conditions, for example with regard to the selection of the limit pressure. In comparison with conventional pressure valves, for example ball valves, the closing plug according to the invention requires a smaller installation space.

The holding means of the holding section can be latching means which latch on the body opening. The holding section can be, for example, (hollow-) cylindrical. One or more elastically moveable latching projections can be arranged on the outer side of the holding section, which latching projections are first of all pressed inward upon entry into the body opening and, after passage through the body opening, move back into their starting position and latch behind the body opening.

According to one particularly practical refinement, the sealing arms of the sealing body can each extend in the radial direction on the upper side of the plate-shaped head section.

According to a further refinement, the sealing body can comprise a sealing lip extending in a ring-shaped manner around the edge of the plate-shaped head section, wherein the sealing arms each extend starting from the sealing lip. The sealing lip is fixedly held to the edge of the plate-shaped head section. For example, it can surround, in a form-fit manner, a flange which is formed at the edge of the head section. In the state of the closing plug in which it is inserted into the opening of the body structure, the sealing lip bears sealingly against the upper side of the body structure. In this refinement, the sealing arms can be connected, for example, in each case only at the outwardly circumferential sealing lip. They can run in a star-shaped manner over the upper side of the plate-shaped head section, with the result that each sealing arm is connected co the sealing lip with its ends which lie opposite.

The sealing arms can be connected to a central section of the sealing body provided on the upper side of the plate-shaped head section. The central section ensures additional stability for the sealing arm structure. The sealing arms can run in a spoke-shaped manner over the upper side of the plate-shaped head section. The sealing arms can extend, for example, in each case between the outer circumferential sealing lip and the central section. They are then in each case connected with their one end on the sealing lip and with their other end on the central section.

The central section can be fixedly held on the plate-shaped head section, for example on its upper side. The connection can be, for example, in a form-fit manner. The fixed connection of the central section on the head section affords further improved dimensional stability of the closing plug and therefore an improved sealing action during operation. The central section can thus extend, for example, through a suitable continuous cutout of the head section and can engage behind the cutout with a section of greater cross section than the cutout. Refinements of this type can be produced in a simple way on account of the molding according to the invention of the sealing body. If the central section is held fixedly on the head section, the sealing arms bend upward, if the limit pressure is exceeded, in particular in each case between their connections on the sealing lip on one side and on the central section on the other side. This refinement can be used, in particular, if relatively high limit pressures are to be realized.

As an alternative, it is also possible that the central section is not held fixedly on the plate-shaped head section. The central section is then also raised up from the upper side of the plate-shaped head section if the limit pressure is exceeded and the sealing arms are bent. This refinement may be suitable, in particular, if relatively low limit pressures are to be realized.

According to a further refinement, the at least one sealing arm can comprise at least one projection, wherein the at least one projection is arranged in the at least one opening of the place-shaped head section covered by the at least one sealing arm up to an exceeding of the limit, pressure. In the case of a plurality of sealing arms, each of the sealing arms can correspondingly comprise a projection, wherein the projections are arranged in the through holes of the plate-shaped head section which are covered by the sealing arms until the limit, pressure is exceeded. The projection or projections of the sealing arm or sealing arms therefore protrudes or protrude, in particular, from the underside of the sealing arm or the sealing arms. If the limit pressure is exceeded, the projection or projections moves move partially or completely out of the corresponding opening or openings of the plate-shaped head section on account of the elastic deformation of the sealing arm or sealing arms, and thus release said opening or openings for the passage of gas and/or fluid. In this refinement, a particularly satisfactory sealing action is achieved until the limit pressure is exceeded, in particular by way of a further improvement of the dimensional stability of the closing plug, in particular of the sealing arm structure.

Furthermore, the plate-shaped head section can comprise several elevated sections on its upper side, which lie flush with the upper side of the at least one sealing arm or the sealing arms until an exceeding of the limit pressure. In this refinement, in particular, a completely flushly closed surface of the closing plug can be realized. If the limit pressure is exceeded, at least the at least one sealing arm is raised upward, with the result that the flush nature of the surface is canceled.

According to a further refinement, the at least one opening of the plate-shaped head section can have such a size that it allows the passage of air but not the passage of a foam. This refinement is advantageous, in particular, if the closure plug is arranged in a body structure which is to be foamed from the inner side. By the at least one opening or the plurality of openings being selected in a suitable manner, a passage of gas which is displaced by the foaming can admittedly be allowed through the openings/openings for pressure equalization, but a passage of the foam and therefore overfoaming on the outer side of the body structure can be prevented. The respectively suitable size of the opening/openings depends, in particular, on the foam which is used. As has been mentioned, PU foams are often used. For example, a diameter of the opening/openings can be less than 1.0 mm, preferably less than 0.5 mm, further preferably smaller than 0.2 mm.

The closing plug according to the invention can be produced, in particular, in a two-component injection molding process. To this extent, the invention also relates to a corresponding method for producing a closing plug according to the invention in a two-component injection molding process and to a method for mounting a closing plug according to the invention on an opening of a body structure. The production of the closing plug according to the invention is simplified further in this way. By way of suitable adaptation of the two-component injection molding process, for example, a different shrinking characteristic firstly of the soft component (sealing body) and secondly of the hard component (base body) can be realized. The shrinking characteristics can be adapted to one another in such a way that there is the required mobility of the sealing arm or the sealing arms for operation after conclusion of the two-component injection molding process. In particular, which regions of the sealing body are fixedly held on the base body and which are not after cooling of the plastic materials can be controlled in this way in a targeted manner. In particular, it has to be ensured that the sealing arm or sealing arms can be raised up under elastic deformation from the opening or openings of the plate-shaped head section which is/are covered in the basic state.

Figure 2:
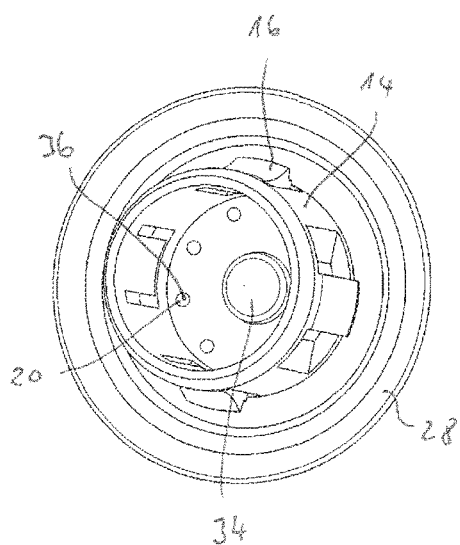
Figure 3:
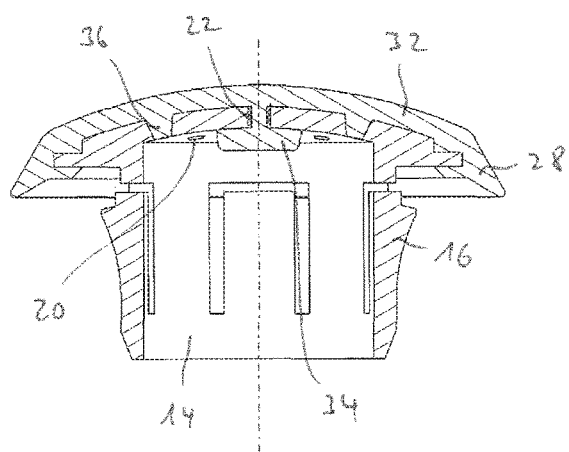
Figure 4:
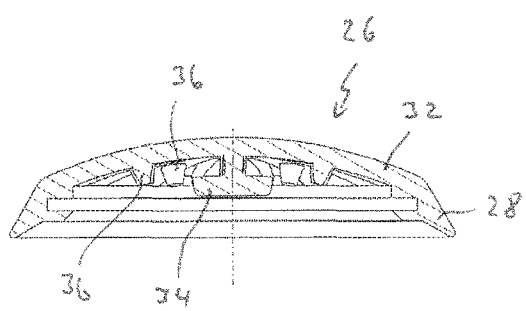
Figure 5:
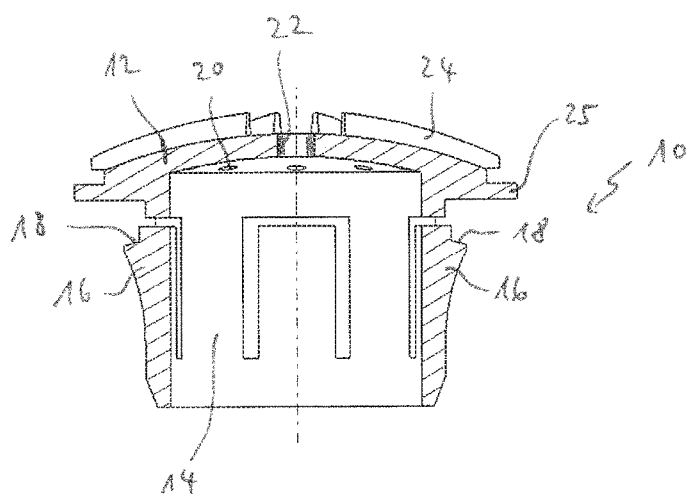
Figure 6:
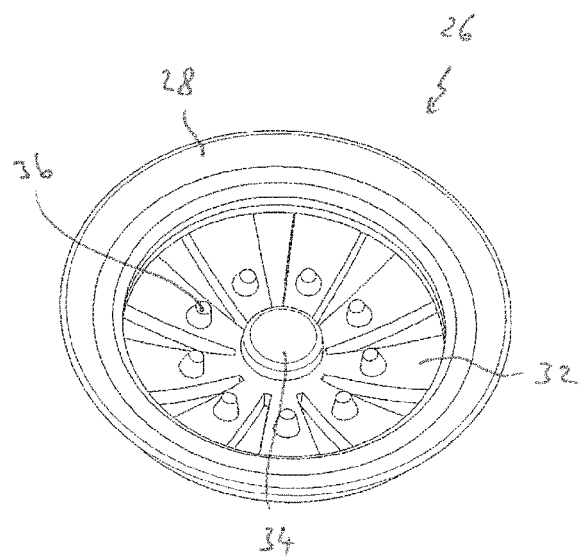
Figure 7:
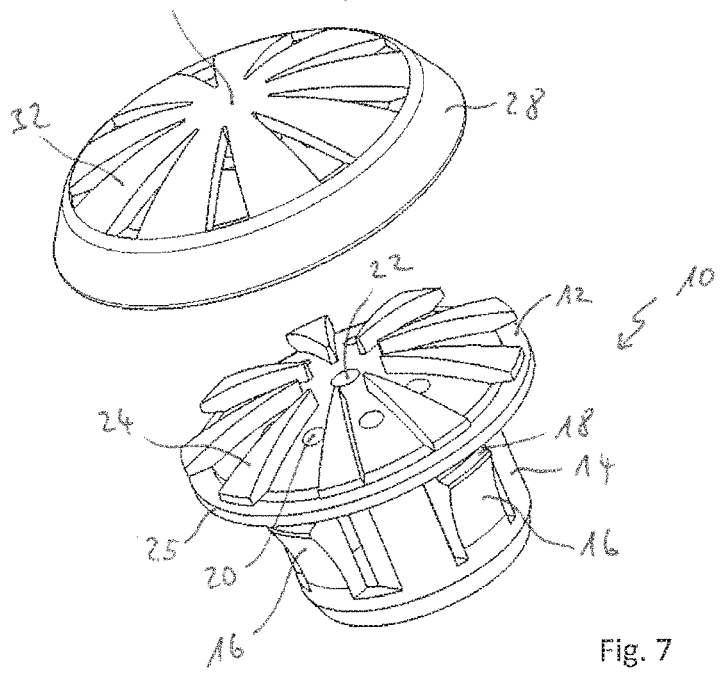

One exemplary embodiment of the invention will be explained in greater detail in the following text using figures, in which, diagrammatically:

FIG. 1 shows a closing plug according to the invention in a perspective view of the upper side, FIG. 2 shows the closing plug from FIG. 1 in a perspective view of the underside, FIG. 3 shows the closing plug according to the invention from FIG. 1 in a sectional view, FIG. 4 shows the sealing body of the closing plug according to the invention which is shown in FIG. 1, in a sectional view, FIG. 5 shows the base body of the closing plug which is shown in FIG. 1, in a sectional view, FIG. 6 shows the sealing body of the closing plug according to the invention which is shown in FIG. 1, in a perspective view of the underside, and FIG. 7 shows the sealing body and the base body of the closing plug according to the invention which is shown in FIG. 1, in a perspective view in the state, in which they are separated from one another.

If nothing else is specified, identical designations denote identical objects in the figures. FIGS. 1 to 3 show various illustrations of the closing plug according to the invention consisting of a base body made from a first plastic material and a sealing body made from a second, softer plastic material. For illustrative reasons, the sealing body and the base body are shown separately from one another in FIGS. 4 to 7. It goes without saying that this is done purely for illustrative reasons, since, in particular in the case of the production of the closing plug in a two-component injection molding process, the sealing body and the base body are produced directly to form the closing plug which is shown in FIGS. 1 to 3.

As can be seen, for example, in FIGS. 5 and 7, the base body 10 has a plate-shaped, upwardly curved head section 12, starting from the underside of which a hollow-cylindrical holding section 14 extends. A plurality of elastic latching legs 16 are formed on the hollow-cylindrical section 14. When the closing plug is inserted into an opening of a body structure, the latching legs 16 are first of all pressed elastically inward. After the passage of the opening of the body structure, the latching legs 16 latch with their latching faces 18 behind the body opening, with the result that the closing plug is held reliably in the body opening.

The cover-shaped head section 12 has a plurality of through holes 20. In the present case, the through holes 20 are formed in the head section 12 in a manner which is distributed regularly along a circular path. Moreover, the head section 12 has a central continuous cutout 22. In each case one elevation 24 is formed on the upper side of the head section 12 in each case between two of the openings 20 which are arranged along the circular path. As can be seen, for example, in FIG. 7, the elevations 24 form circular segments in plan view, that is to say are configured, in particular, in the manner of cake slices. For example, a flange 25 which is formed on the edge of the head section 12 can be seen in FIGS. 5 and 7, moreover.

As can be seen in FIGS. 1 to 3, a sealing body 26 which is shown, for example, in FIGS. 4 to 7 is connected to the base body 10. In the example which is shown, the sealing body 26 is molded onto the base body 10. In particular, the production of the closing plug which is shown in FIGS. 1 to 3 takes place in a two-component injection molding process. The sealing body 26 which consists of a softer plastic material than the main body 10 has a sealing lip 28 which surrounds the flange 25 of the plate-shaped head section 12 of the base body 10 in a form-fit manner. A plurality of elastic sealing arms 32 which extend in a spoke-shaped manner in the radial direction run between the sealing lip 28 and a central section 30 of the sealing body 26. It can be seen, in particular, in the sectional views of FIGS. 3 and 4 that the central section 30 extends through the continuous cutout 22 of the head section 12 and engages behind said cutout 22 with a section 34 which is of enlarged cross section in comparison with the cutout 22. In this way, the central section 30 is fixedly held on the head section 12 in a form-fit manner.

It can be seen, for example, in FIG. 6 that each of the elastic sealing arms 32 has a frustoconical projection 36 on its underside. In the basic state of the closing plug which is shown in FIGS. 1 to 3, each of the projections 36 engages into one of the openings 20 of the head section 12. It can be seen, for example, in FIG. 1 that, in this basic state, the elevations 24 of the base body 10 form a closed flush surface together with the sealing body 26, in particular the elastic sealing arms 32.

The closing plug which is shown in FIGS. 1 to 3 is inserted into an opening of a body structure. In the inserted state, the sealing lip 28 bears sealingly on the surface of the body structure. In the basic state which is shown in FIGS. 1 to 3, the body opening is sealed against a passage of fluid and/or gas. If a pressure above the limit, pressure occurs in the interior of the body structure, for example on account of water which accumulates or as a result of gas which is displaced during a foaming process, the elastic sealing arms 32 are bent elastically upward away from the upper side of the head section 12. Here, the projections 36 of the sealing arms 32 exit the openings 20 partially or completely. The openings which are closed sealingly by way of the sealing arms 32 in the basic state of the closing plug are therefore released for the passage of gas and/or fluid from the inner side of the body structure to the outside. As a result, corresponding pressure equalization is brought about. As soon as the pressure which prevails on the inner side of the body structure reaches the limit pressure again or falls below the limit pressure on account of said pressure equalization, the sealing arms 32 move back into their basic state which is, shown in FIGS. 1 to 3, and the body opening is again closed sealingly.

The invention claimed is:

1. Closing plug for an opening in a body structure of an automobile, wherein the closing plug closes the opening against a passage of fluid and/or gas up to a limit pressure which acts on the closing plug, and allows a passage of fluid and/or gas above the limit pressure, characterized in
that the closing plug comprises a base body consisting of a first plastic material, which has a holding section with means for holding the closing plug in the opening and a plate-shaped head section provided on one end of the holding section with at least one opening and
that the closing plug comprises a sealing body of a second plastic material molded onto the base body in a plastic injection molding process, wherein the second plastic material is softer than the first plastic material, and wherein the sealing body comprises at least one elastically moveable sealing arm wherein the at least one sealing arm sealingly covers the at least one opening the plate-shaped head section from the upper side of the plate-shaped head section facing away from the holding section against a passage of fluid and/or gas up to the limit pressure, and wherein the at least one sealing arm elastically deforms upon acting of a pressure above the limit pressure with the release of the at least one opening for a passage of fluid and/or gas.

2. Closing plug according to claim 1, wherein a plurality of openings are formed in the plate-shaped head section, the plurality of openings including the at least one opening of the plate-shaped head section, wherein the sealing body comprises a plurality of sealing arms, which sealingly cover the plurality of openings of the plate-shaped head section from the upper side of the plate-shaped head section facing away from the holding section against a passage of fluid and/or gas up to the limit pressure, wherein the plurality of sealing arms elastically deform upon acting of a pressure above the limit pressure with the release of the plurality of openings of the plate-shaped head section for a passage of fluid and/or gas.

3. Closing plug according to claim 2, the sealing arms of the sealing body extend each in radial direction on the upper side of the plate-shaped head section.

4. Closing plug according to claim 2, wherein the sealing body comprises a sealing lip extending in a ring-shaped manner around the edge of the plate-shaped head section wherein the sealing arms each extend starting from the sealing lip.

5. Closing plug according to claim 2, wherein the sealing arms are connected with a central section of the sealing body provided on the upper side of the plate-shaped head section.

6. Closing plug according to claim 5, wherein the central section is fixedly connected with the plate-shaped head section.

7. Closing plug according to claim 6, wherein the central section is held on the plate-shaped head section in a form-fit manner.

8. Closing plug according to claim 1, wherein the at least one sealing arm comprises at least one projection, wherein the at least one projection is arranged in the at least one opening of the plate-shaped head section covered by the at least one sealing arm up to an exceeding of the limit pressure.

9. Closing plug according to claim 1, wherein the plate-shaped head section comprises several elevated sections on its upper side, which lie flush with the upper side of the at least one sealing arm until an exceeding of the limit pressure.

10. Closing plug according to claim 1, wherein it is produced in a two-component injection-molding process.

11. Closing plug for an opening in a body structure of an automobile, wherein the closing plug closes the opening against a passage of fluid and/or gas up to a limit pressure which acts on the closing plug, and allows a passage of fluid and/or gas above the limit pressure, characterized in
that the closing plug comprises a base body consisting of a first plastic material, which has a holding section with the holding section configured to hold the closing plug in the opening and a plate-shaped head section provided on one end of the holding section with at least one opening and
that the closing plug comprises a sealing body of a second plastic material molded onto the base body in a plastic injection molding process, wherein the second plastic material is softer than the first plastic material, and wherein the sealing body comprises at least one elastically moveable sealing arm wherein the at least one sealing arm sealingly covers the at least one opening the plate-shaped head section from the upper side of the plate-shaped head section facing away from the holding section against a passage of fluid and/or gas up to the limit pressure, and wherein the at least one sealing arm elastically deforms upon acting of a pressure above the limit pressure with the release of the at least one opening for a passage of fluid and/or gas.

12. Closing plug according to claim 1, wherein a plurality of openings are formed in the plate-shaped head section, the plurality of openings including the at least one opening of the plate-shaped head section, wherein the sealing body comprises a plurality of sealing arms, which sealingly cover the plurality of openings of the plate-shaped head section from the upper side of the plate-shaped head section facing away from the holding section against a passage of fluid and/or gas up to the limit pressure, wherein the plurality of sealing arms elastically deform upon acting of a pressure above the limit pressure with the release of the plurality of openings of the plate-shaped head section for a passage of fluid and/or gas.

13. Closing plug according to claim 12, the sealing arms of the sealing body extend each in radial direction on the upper side of the plate-shaped head section.

14. Closing plug according to claim 12, wherein the sealing body comprises a sealing lip extending in a ring-shaped manner around the edge of the plate-shaped head section wherein the sealing arms each extend starting from the sealing lip.

15. Closing plug according to claim 12, wherein the sealing arms are connected with a central section of the sealing body provided on the upper side of the plate-shaped head section.

16. Closing plug according to claim 15, wherein the central section is fixedly connected with the plate-shaped head section.

17. Closing plug according to claim 16, wherein the central section is held on the plate-shaped head section in a form-fit manner.

18. Closing plug according to claim 11, wherein the at least one sealing arm comprises at least one projection, wherein the at least one projection is arranged in the at least one opening of the plate-shaped head section covered by the at least one sealing arm up to an exceeding of the limit pressure.

19. Closing plug according to claim 11, wherein the plate-shaped head section comprises several elevated sections on its upper side, which lie flush with the upper side of the at least one sealing arm until an exceeding of the limit pressure.

20. Closing plug according to claim 11, wherein it is produced in a two-component injection-molding process.

* * * * *